US006722563B1

(12) United States Patent
Johnson et al.

(10) Patent No.: US 6,722,563 B1
(45) Date of Patent: Apr. 20, 2004

(54) METHOD FOR PRINTING A LABEL PAIR WITH INFORMATION-BASED INDICIA PROGRAM (IBIP) INDICIA

(75) Inventors: Robert J. Johnson, Naugatuck, CT (US); Allen L. Kramer, Middletown, CT (US); Gabriel E. Pettner, Orange, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/690,284

(22) Filed: Oct. 17, 2000

(51) Int. Cl.$^{7}$ ............................................... G06F 17/00

(52) U.S. Cl. .................. 235/375; 235/375; 235/462.01; 235/494; 283/70; 283/81

(58) Field of Search ........................... 235/375, 462.01, 235/494; 283/70–71, 79, 74, 81

(56) References Cited

U.S. PATENT DOCUMENTS

| | | | | | |
|---|---|---|---|---|---|
| 4,065,117 | A | | 12/1977 | Thorsheim | 270/58 |
| 4,717,059 | A | | 1/1988 | Takahashi | 226/2 |
| 4,743,747 | A | * | 5/1988 | Fougere et al. | 235/494 |
| 4,934,846 | A | | 6/1990 | Gilham | 400/104 |
| 4,939,674 | A | | 7/1990 | Price et al. | 364/523 |
| 5,051,565 | A | * | 9/1991 | Wolfram | 235/384 |
| 5,129,682 | A | | 7/1992 | Ashby | 283/81 |
| 5,200,903 | A | | 4/1993 | Gilham | 364/464.02 |
| 5,270,522 | A | * | 12/1993 | Bone, Jr. | 235/375 |
| 5,292,008 | A | * | 3/1994 | Sansone et al. | 209/584 |
| 5,388,049 | A | | 2/1995 | Sansone et al. | 364/464.02 |
| 5,407,718 | A | | 4/1995 | Popat et al. | 428/42 |
| 5,486,055 | A | | 1/1996 | Oka | 400/61 |
| 5,501,393 | A | | 3/1996 | Walz | 229/92.8 |
| 5,547,227 | A | | 8/1996 | Laurash et al. | 283/81 |
| 5,573,277 | A | | 11/1996 | Petkovsek | 283/79 |
| 5,621,864 | A | | 4/1997 | Benade et al. | 395/117 |
| 5,640,447 | A | | 6/1997 | Fonseca | 379/144 |
| 5,664,725 | A | | 9/1997 | Walz | 229/92 |
| D386,204 | S | | 11/1997 | Kara | D19/3 |
| D386,783 | S | | 11/1997 | Kara | D19/3 |
| 5,697,648 | A | | 12/1997 | Petkovsek | 283/61 |
| 5,717,597 | A | | 2/1998 | Kara | 364/464.18 |

(List continued on next page.)

FOREIGN PATENT DOCUMENTS

| | | | | |
|---|---|---|---|---|
| DE | 3233005 A1 * | 9/1982 | | |
| WO | WO99/15340 | 4/1999 | ........... | B42D/15/00 |

OTHER PUBLICATIONS

U.S. patent application Ser. No. 09/433,482. Specification and Figures as originally filed are attached hereto.

*Primary Examiner*—Diane I. Lee
*Assistant Examiner*—Seung H Lee
(74) *Attorney, Agent, or Firm*—Angelo N. Chaclas; Charles R. Malandra; George M. Macdonald

(57) ABSTRACT

A method for printing a label pair made up of a destination address label and a corresponding destination Information-Based Indicia Program (IBIP) indicia label on a label stock in a system for printing one or more labels uses a unique identifying mark for each label of the label pair. The unique identifying marks allow a user to match a destination address label to a corresponding destination address IBIP indicia label. The software defines the method used to generate the unique identifying marks and the positioning of the labels with respect to each other.

11 Claims, 4 Drawing Sheets

U.S. PATENT DOCUMENTS

| | | | | | |
|---|---|---|---|---|---|
| D395,333 | S | | 6/1998 | Kara | D19/3 |
| 5,806,421 | A | * | 9/1998 | Dolan et al. | 101/93.01 |
| 5,829,895 | A | * | 11/1998 | Hayashi et al. | 400/124.05 |
| 5,848,401 | A | | 12/1998 | Goldberg et al. | 705/408 |
| 5,848,810 | A | | 12/1998 | Beaudoin et al. | 283/67 |
| 5,876,555 | A | | 3/1999 | Hellsund et al. | 156/540 |
| 5,925,864 | A | * | 7/1999 | Sansone et al. | 235/375 |
| 5,929,415 | A | * | 7/1999 | Berson | 235/382 |
| 5,944,461 | A | | 8/1999 | Kanbar | 408/705 |
| 6,010,156 | A | * | 1/2000 | Block | 281/2 |
| 6,142,380 | A | * | 11/2000 | Sansone et al. | 235/487 |
| 6,188,996 | B1 | * | 2/2001 | Sansone | 705/408 |
| 6,209,920 | B1 | * | 4/2001 | Fabel | 283/62 |
| 6,244,763 | B1 | * | 6/2001 | Miller | 400/76 |
| 6,296,404 | B1 | | 10/2001 | Pierce et al. | 400/62 |
| 2001/0023408 | A1 | | 9/2001 | Evoy et al. | 705/14 |

* cited by examiner

METHOD FOR PRINTING A LABEL PAIR WITH INFORMATION-BASED INDICIA PROGRAM (IBIP) INDICIA

TECHNICAL FIELD

The present invention relates generally to a method of printing labels and deals more particularly with a method of printing a label pair with Information-Based Indicia Program (IBIP) indicia.

BACKGROUND OF THE INVENTION

The United States Postal Service (USPS) initiated the Information-Based Indicia Program (IBIP) to support new methods of applying postage to mail. As part of the program, the USPS IBIP specification requires that the destination address information be embedded as part of and incorporated into machine readable form, such as a two-dimensional barcode indicia in addition to a user readable form. When a mail piece is printed on a single element such as an envelope or shipping label the printing subsystem consequently matches the destination address and the indicia elements. However, when the destination address resides on a separate label from the indicia destination address label, the user of the system must bear the burden of matching the corresponding labels. It is sometimes difficult to match these labels when more than one destination address and corresponding indicia pair is printed at once for example, on a sheet of labels having different addresses. While a user can clearly read the destination address, the IBIP is a machine-readable code and thus cannot be easily differentiated from other IBIP labels.

Accordingly, it is an object of the present invention to provide a method of printing a label pair with IBIP indicia.

It is a further object of the present invention to provide a method of printing a label pair with IBIP indicia having a unique identifying mark for use in matching the destination address label and the corresponding IBIP indicia destination address label.

It is yet a further object of the present invention to provide a method of printing a label pair with IBIP indicia using a number of different label stocks.

SUMMARY OF THE INVENTION

The method of the present invention substantially obviates, if not entirely eliminates, the disadvantages and shortcomings of matching destination address labels and corresponding IBIP indicia labels printed on the label stock. The method of the present invention accomplishes this by providing a unique identifying mark for each label pair printed.

In its broader aspect, the invention provides a method for printing an indicia on a label in a system for printing one or more labels. The method includes the steps of reading a label configuration file wherein the label configuration file is indicative of one or more label stocks, selecting a label stock, reading a definition file associated with the selected label stock, selecting the number of labels to be printed, printing the number of labels in accordance with the definition file, such that a label pair made up of a destination address and a corresponding indicia is printed wherein the corresponding indicia further comprises a destination barcode and tagging the label pair with a unique identifying mark.

The method further includes the destination barcode being an encryption of the destination address.

A further aspect of the invention includes printing the destination address label first and printing the corresponding indicia label subsequently.

A yet further aspect of the invention includes tagging the label pair with a coding identifier in a predetermined inconspicuous area of the label pair.

These and other objects and features of the method of the present invention will become more apparent from an understanding of the following detailed description of a preferred embodiment when considered in conjunction with the accompanying drawings.

DETAILED DESCRIPTION

Figure 1:
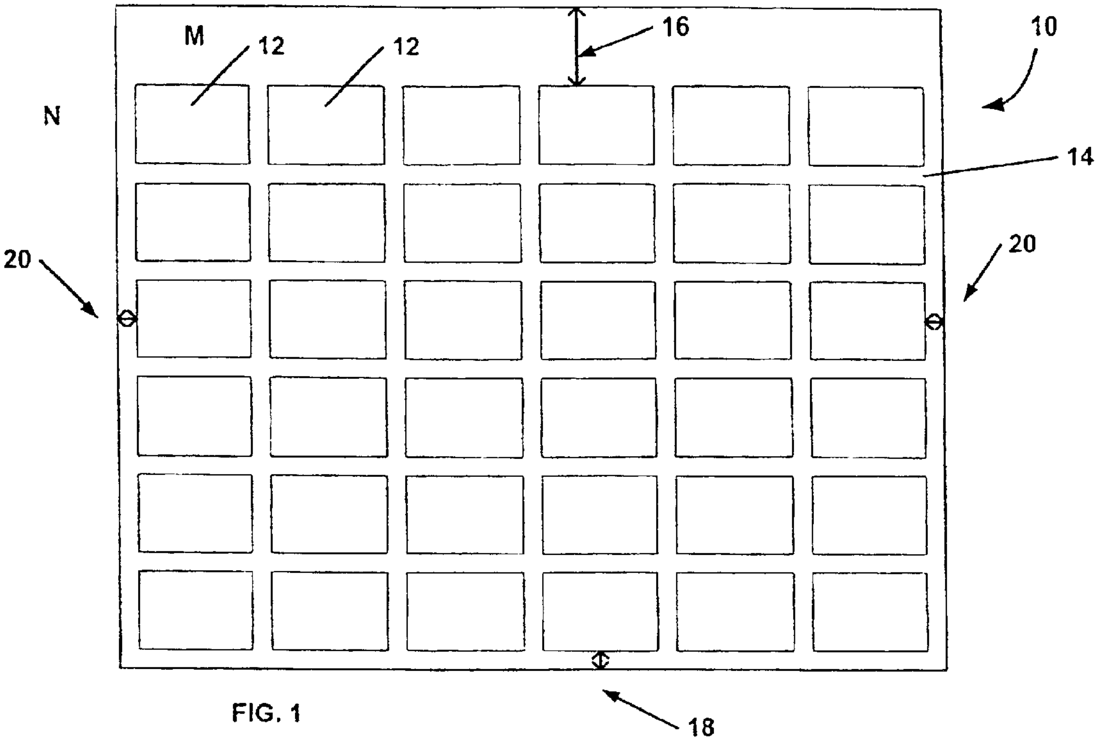
FIG. 1 shows schematically a label stock having N rows by M columns of labels.

Turning now to the drawings and considering the present invention in further detail, FIG. 1 shows schematically a representative label stock generally designated 10 having N rows by M columns of labels 12. The labels 12 are typically self-adhesive and are carried on a releasable sheet 14 for easy removal by an operator for transferring and affixing to a surface such as the face of a mail piece, envelope or package. Different label stocks have differing numbers of rows and columns and differing sizes of labels carried thereon. Typically, the attributes of a given label stock are predefined as to the size of the sheet 14, the number of labels 12, the size and shape of the label 12, the print area of the label and the spacing of the labels in each position in each row and column relative to one another, the top 16, bottom 18 and side margins 20 between the label edges with respect to the edges of the sheet 14. Additionally, the printing area of the label is defined and the required spacing between print areas is also defined. Typically, a manufacturer of such label stock provides the pertinent attribute information for a user. A number of commercially available different label stocks are available, and each typically have the label stock attributes specified by the manufacturer. In addition to the commercially available predefined label stock, it is also contemplated that custom-sized labels and label stock may be employed with the method of the present invention.

Figure 2:
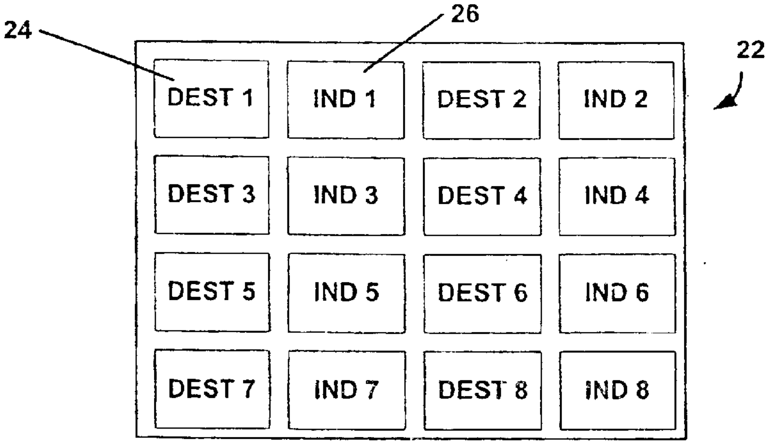
FIG. 2 shows a label stock wherein the matching label pairs are printed horizontally.

Depending upon the label stock chosen, the user may desire to print the matching label pairs horizontally as illustrated in FIG. 2, wherein the label stock generally designated 22, has four columns by four rows of labels. In FIG. 2, the label stock 22 has illustrated therein label 24 identified as "DEST 1," and a label 26 located horizontally and immediately adjacent to label 24 designated "IND 1." The label 24 has printed thereon the user-readable destination address and label 26 has printed thereon the corresponding IBIP indicia with the address information embedded therein. The sequence of printing the destination label and its corresponding indicia label as shown in FIG. 2 is printed horizontally starting in the upper left corner moving to the lower right corner in sequence.

Figure 3:
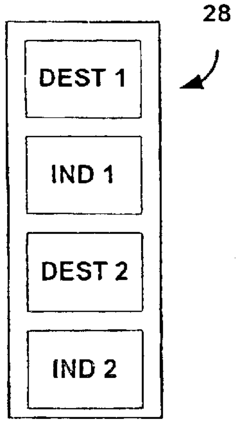
FIG. 3 shows a label stock wherein the matching label pairs are printed vertically.

FIG. 3 illustrates a further label stock generally designated 28 wherein the label pairs are printed vertically. Alternatively, the label stock 28 may be rotated to print the label pairs horizontally for convenience of the user.

Figure 4:
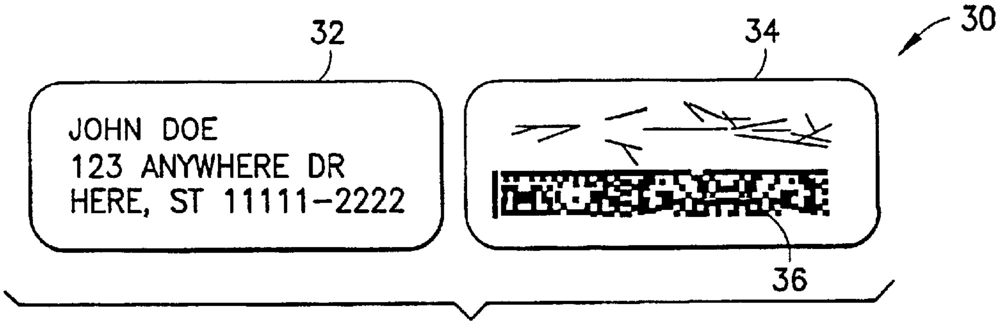
FIG. 4 shows a destination address label and a corresponding destination address IBIP indicia label defining a label pair.

Turning now to FIG. 4, a label pair generally designated 30 is made up of a destination address label 32 wherein a user can clearly read the destination address and a corresponding destination IBIP indica label 34 wherein the destination address is embedded and encrypted in a machine-readable two-dimensional barcode 36. In situations where the label pairs 30 are printed for application to a single mail piece, a user has no difficulty in associating the destination IBIP indicia label with the user-readable destination address label. However, if a number of label pairs are printed on a label stock, for example, the user will encounter substantial difficulty in associating a corresponding destination IBIP indicia label with a destination address label in the absence of some identifier used to identify each of the labels in a label pair.

Turning now to FIGS. 5 through 8, exemplary identifiers are illustrated therein as applied to multiple labels to provide a visual indication to a user for associating or matching a destination address label with its corresponding destination IBIP indicia label. For purposes of the disclosure, two label pairs are illustrated in FIGS. 5 through 8, it being understood that any number of label pairs up to the maximum number of label pairs that can be printed on a label stock may be identified with the method of the present invention.

Figure 5:
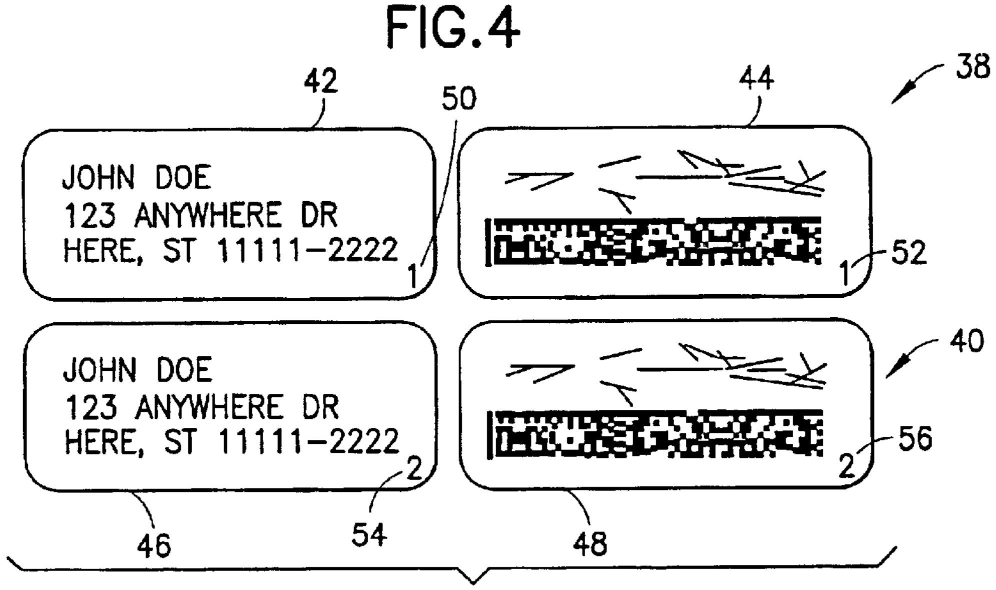
FIG. 5 shows one embodiment of a label pair tagged with a numeric identifying mark in the lower right corner of the labels.

Considering FIG. 5, label pairs 38, 40 are illustrated therein with the label pair 38 having a user-readable destination address label 42 and a corresponding destination IBIP indicia label 44 and the label pair 40 having a user-readable destination address label 46 and a corresponding destination IBIP indicia label 48. The label pair 38 further includes a numeric identifying mark in the lower right hand corner of each of the labels 42, 44 wherein the identifying mark 50 of the label 42 matches the identifying mark 52 of the label 44. Likewise, the identifying mark 54 of label 46 matches the identifying mark 56 of label 48. Each of the label pairs printed on the label stock will likewise have unique identifiers for each label pair so that the destination address label can be matched without difficulty by a user to a corresponding destination IBIP indicia label.

Figure 6:
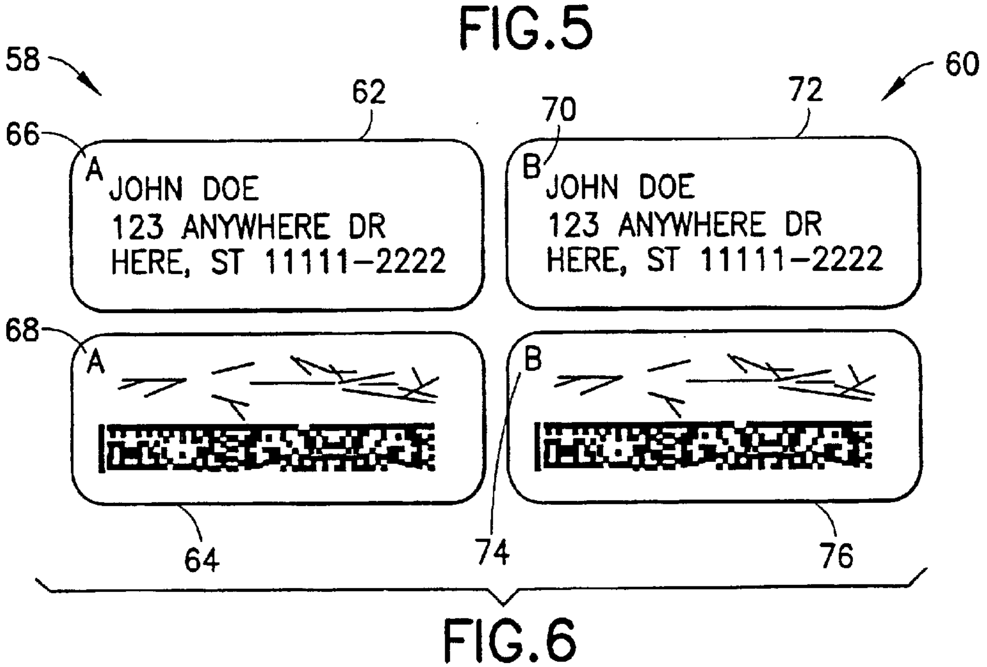
FIG. 6 shows another embodiment of a label pair tagged with a letter character identifying mark in the top left corner of the labels.

FIG. 6 shows another embodiment of a label pair tagged with a letter character identifying mark in the top left corner of each label wherein the label pairs 58, 60 are printed vertically on the label stock. The label pair 58 is made up of the destination address label 62 and the corresponding destination IBIP indicia label 64, wherein the identifying letter character 66 of label 62 matches the identifying letter character 68 of the label 64. Label pair 60 likewise includes a letter character identifying mark 70 on the destination address label 72 and a matching letter character identifying mark 74 on the corresponding destination IBIP indicia label 76. Again, as in FIG. 5, the identifying mark of each label pair is unique relative to the identifying marks of other label pairs printed on the label stock.

Figure 7:
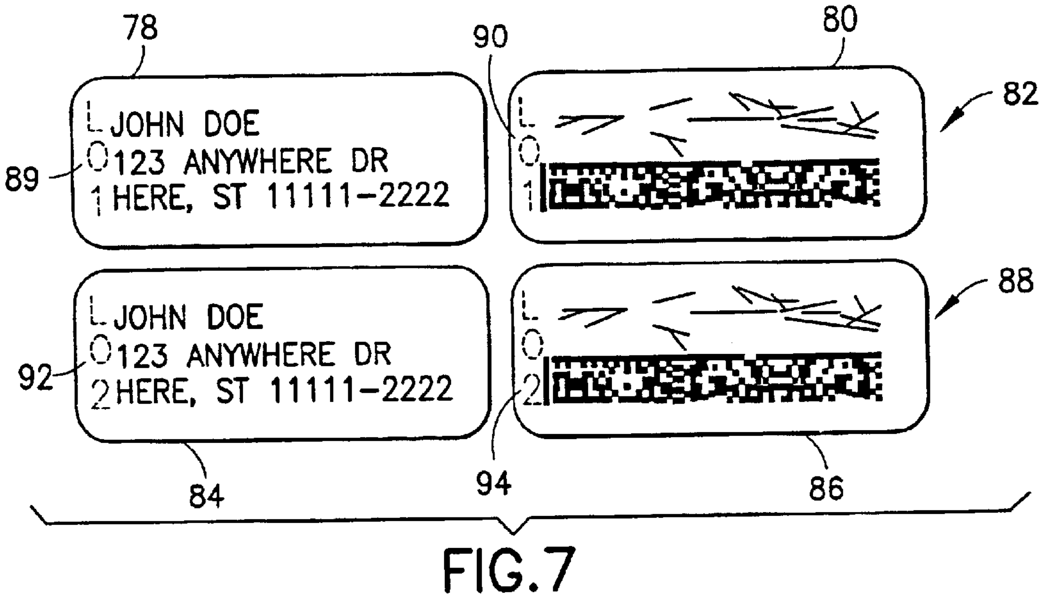
FIG. 7 shows a further embodiment of a label pair tagged with a watermark on the left side of the labels.

Turning now to FIG. 7, the labels 78, 80 of label pair 82 and labels 84, 86 of label pair 88 are illustrated with a watermark identifying character printed in the left side margin of the respective labels, wherein the watermark 89 of label 78 matches the watermark.90 of label 80, which allows a user to associate the destination address label 78 with a corresponding destination IBIP indicia label 80. Likewise, the label pair 88 utilizes a different watermark than the watermark used on the label pair 82. The label 84 includes a watermark 92 that matches the watermark 94 of label 86 to allow the user to, identify the destination address label and corresponding destination IBIP indicia label 86 of label pair 88.

Figure 8:
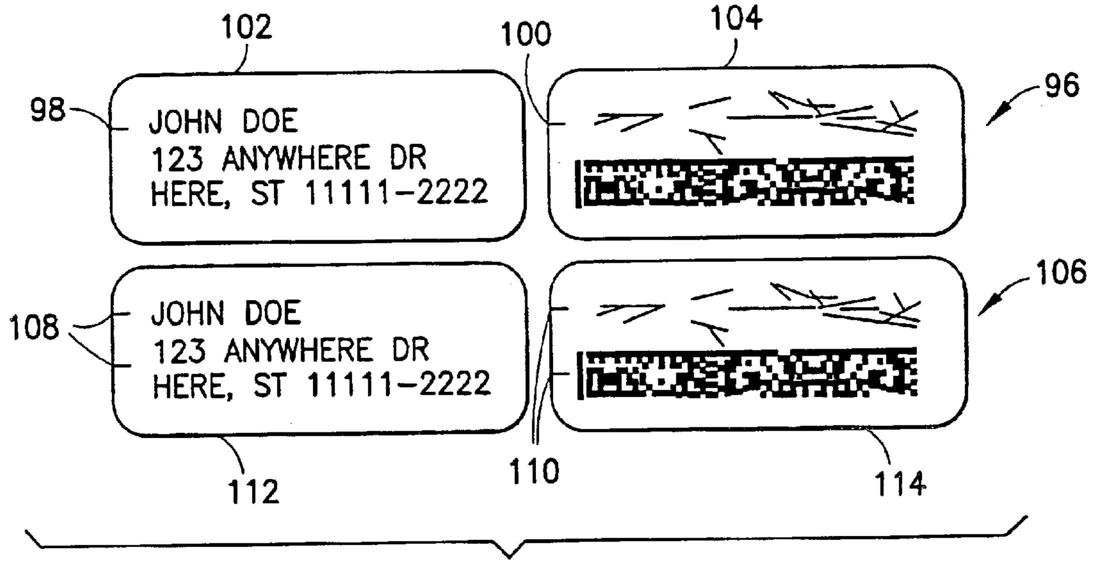
FIG. 8 shows a yet further embodiment of a label pair tagged with a tick hashing line on the left sideof the labels.

Turning now to FIG. 8, a yet further embodiment of a label pair tagged with a unique identifying mark is illustrated therein, wherein the label pair 96 has a single tick hash line 98, 100 on the destination address label 102 and corresponding destination IBIP indicia label 104, respectively. The label pair 106 is identified by means of two tick hash lines 108, 110 of the destination address label 112 and corresponding destination IBIP indicia label 114, respectively.

Figure 9:
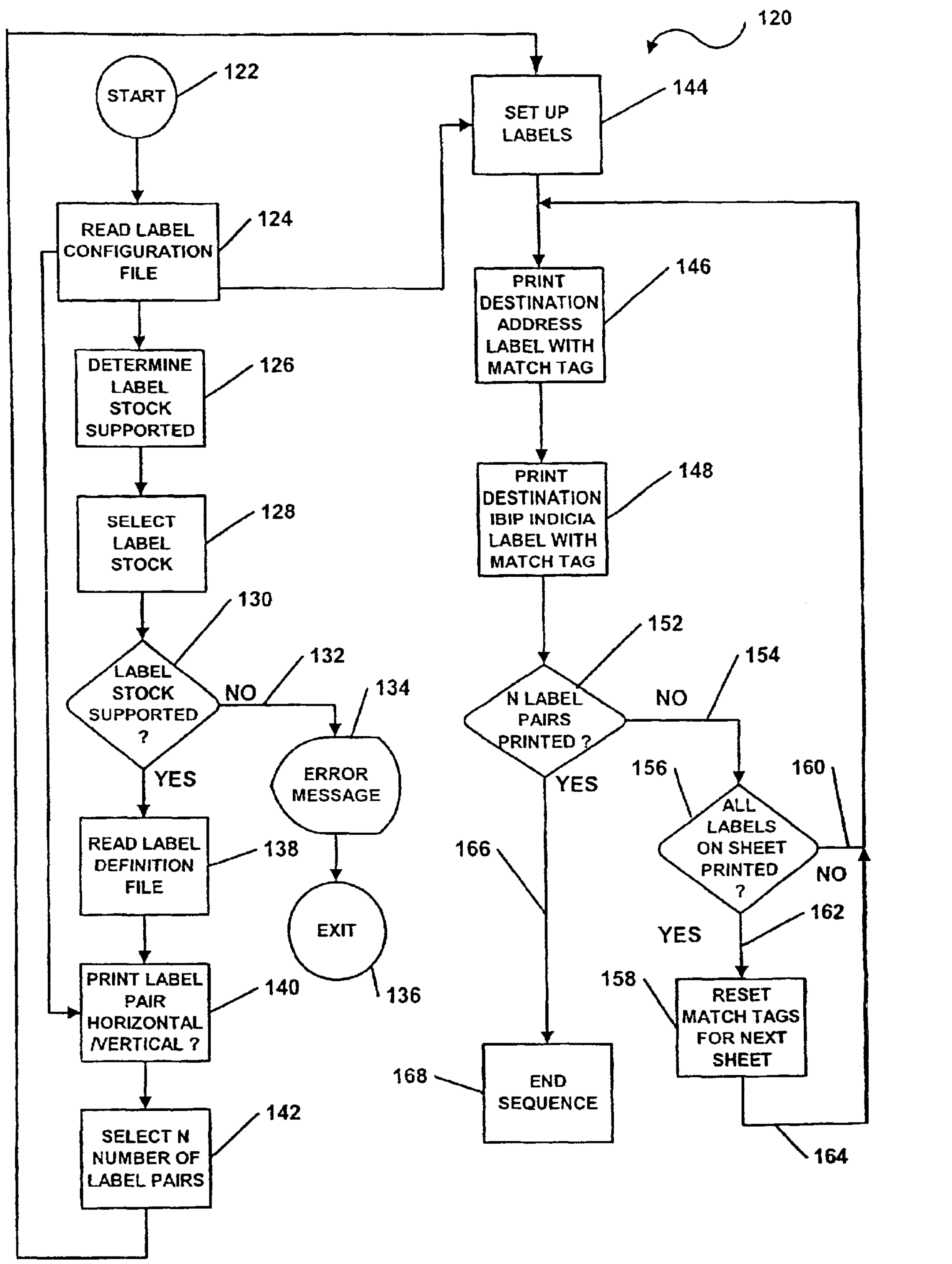
FIG. 9 is a flow chart of one embodiment of the method of the present invention of printing a label pair with IBIP indicia.

Turning now to FIG. 9, a flow chart of one embodiment of the method of the present invention of printing a label pair with IBIP indicia is illustrated therein and generally designated 120. The method of the present invention is preferably utilized in a system for printing one or more labels; however, as will become readily apparent from the following description, the method of the present invention may be utilized for identifying multiple labels in a label group with encrypted or embedded information in a barcode indicia or other machine readable indicia. In FIG. 9, the printing system initiates activity as represented by the "START" step 122. The printing system typically has a controller which operates in accordance with a set of instructions to cause the printing on a substrate. The system may include means for stacking and feeding the substrate such as the label stocks into the printing system and carry out the required printing activities as directed by a user and the instructions operating the controller. It is further typical that the printing system has a memory means for storing information relative to the various substrates, such as label stocks, which are fed to the printing system in addition to the information that is intended to be printed upon the substrates. The next step after the system is started is to read a label configuration file as indicated by the step 124. After the label configuration file has been read, the system next determines the various label stocks supported as indicated by the step 126. The user then selects a label stock corresponding to the label stock to be printed upon as indicated by in step 128. The system will next determine if the selected label stock is supported as indicated by the decision step 130. If the desired label stock selected is not supported, a signal 132 is output to a display 134 with an appropriate error message to alert the operator that the is label stock selected is not supported by the printing system. The system then exits the instruction sequence as indicated by the "EXIT" block 136.

If in the decision step 130 it is determined that the label stock selected is supported, the label definition file corresponding to the label stock is read as indicated by in step 138. The label definition file includes all of the information relative to the various attributes of the label stock, including the number of labels, dimensional aspects of the labels, spacing, print areas and so forth, as well understood by those skilled in the art of defining attributes for such label stocks.

Once the system determines the attributes of the particular label stock selected, information as to whether to print the label pair made up of the destination address label and a corresponding destination IBIP indicia label horizontally or vertically is determined in step 140 from information defined in the label configuration file previously read by the instruction set. The desired number of labels to be printed is selected as indicated in the "SELECT N NUMBER OF LABEL PAIRS" step 142. The system now sets up the labels in accordance with the information in the label configuration file and in accordance with the N number of label pairs to be printed as indicated by the "SET UP LABELS" step 144.

The system will then begin to print the label stock in accordance with the setup information and will print the first destination address label as indicated by the "PRINT DESTINATION ADDRESS LABEL WITH MATCH TAG" step 146. Once the destination address label is printed, the corresponding destination IBIP indicia label is printed as indicated by the "PRINT DESTINATION IBIP INDICIA LABEL WITH MATCH TAG" step 148. The label pair printed in steps 146 and 148 are tagged with a unique identifying mark as described above. Although steps 146 and 148 are shown as two separate steps for purposes of explanation, in actuality the destination address and IBIP indicia labels are done in one printing step. Each of the label pairs are printed and tagged with unique matching identifying marks in a similar manner, and the system will continue to print until the N number of label pairs have been printed, as indicated by the query step 152. If it is determined in the "N LABEL PAIRS PRINTED?" query step 152 that the N number of label pairs have not been printed, a "NO" signal 154 is output to a query step 156 to determine if all of the labels on the sheet have been printed as indicated by the "ALL LABELS ON SHEET PRINTED?" query step 156. If there are remaining labels on the sheet to be printed, a "NO" signal 160 is output to the steps 146, 148 to return to printing the next label pair with its corresponding unique identifying mark.

If in the query step 152, it is determined that the N number of label pairs have been printed, a "YES" signal 166 is output, and the system advances to the "END SEQUENCE" step 168 to indicate that the printing cycle is completed. If in the query step 156 it is determined that all labels on the sheet have been printed, a "YES" signal 162 is output to reset the match tags for the next sheet of label stock as indicated by the "RESET MATCH TAGS FOR NEXT SHEET" step 158. If it was determined in the query step 152 that the desired N number of label pairs have not been printed, the system returns via 164 to the steps 146, 148 to return to printing the next label pair after the match tags are reset to begin the loop once again.

It should be noted that in the method illustrated in the flow chart 120 of FIG. 9, the identifying marks for the label pairs of a subsequent sheet of label stock can be made to be unique from the previous identifying marks of the label pairs printed on the immediately just printed sheet of label stock in a printing run. The system could also be set to reset to repeat the match tags for the subsequent sheet of label pairs printed on the subsequent sheet of label stock, although it is less desirable to repeat like identifying marks on multiple sheets in the same printing run.

It is to be understood that the method of the present invention is not to be considered as limited to the specific embodiments described above and shown in the accompanying drawings, which merely illustrate the best mode presently contemplated for carrying out the method of the invention and which is susceptible to such changes as may be obvious to one skilled in the label-printing art, but rather that the invention is intended to cover all such variations, modifications and equivalents thereof as may be deemed to be within the scope of the claims appended hereto.

It is claimed:

1. A method for printing an indicia an a label in a system or printing one or more labels comprising the steps of:

reading a label configuration file wherein said label configuration file is indicative of one or more label stocks;

selecting a label stock;

reading a definition file associated with said selected label stock;

selecting an amount of labels to be printed;

printing said amount of labels in accordance with said definition file such that a label pair comprising a destination address label having a destination address and a corresponding indicia label having an indicia is printed, wherein said corresponding indicia further comprises a destination barcode; and tagging each label of said label pair with an identifying mark that is at least locally unique to the label pair, wherein the identifying mark is human discernable to allow a user to match said label pair.

2. A method for printing an indicia on a label as defined in claim 1, wherein the step of printing said destination barcode further comprises printing an encryption of said destination address.

3. A method of printing an indicia on a label as defined in claim 1, wherein the step of printing said amount of labels further comprises printing said destination address first and printing said corresponding indicia subsequently.

4. A method of printing an indicia on a label as defined in claim 3, wherein said destination barcode is a two-dimensional barcode corresponding to the United States Postal Service (USPS) Indicia-based Information Program (IBIP).

5. A method of printing an indicia on a label as defined in claim 1, wherein the step of tagging said label pair includes color coding each of said label pairs with a different color.

6. A method of printing an indicia on a label as defined in claim 1, wherein the step of tagging said label pair includes applying a coding identifier in a predetermined inconspicuous area of said label pair.

7. A method of printing an indicia on a label as defined in claim 6, wherein the coding identifier is a watermark.

8. A method of printing an indicia on a label as defined in claim 6, wherein the coding identifier is an alphanumeric character.

9. A method of printing an indicia on a label as defined in claim 6, wherein the coding identifier is a tick hashing line.

10. The method of claim 1, wherein the identifying mark is unique to the label pair for the amount of labels to be printed.

11. A method for printing an indicia on a label in a system for printing one or more labels comprising the steps of:

reading a label configuration file accessible by said system wherein said label configuration file is indicative of one or more label stocks supported by said system;

selecting a label stock from said label configuration file;

reading a definition file associated with said selected label stock;

selecting an amount of labels to be printed;

printing said amount of labels in accordance with said definition file such that a label pair comprising a destination address a corresponding indicia is printed, wherein said destination address is printed first and said corresponding indicia is printed subsequently, wherein said corresponding indicia further comprises a destination barcode, said destination barcode further comprising an encryption of said destination address; and tagging each label of said label pair with a unique identifying mark, wherein the identifying mark is human discernable to allow a user to match said label pair.

* * * * *